United States Patent
Creutz et al.

(10) Patent No.: US 6,395,790 B1
(45) Date of Patent: *May 28, 2002

(54) SILOXANE EMULSIONS

(75) Inventors: Serge Firmin Alain Creutz, Liège; Benoit Charles Jean Paul Henault, Wezembeek-Oppem, both of (BE)

(73) Assignee: Dow Corning S. A., Seneffe (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/571,367

(22) Filed: May 15, 2000

(30) Foreign Application Priority Data

May 21, 1999 (GB) ............................... 9911840

(51) Int. Cl.⁷ ........................... C08K 5/19; C08L 83/04; B01F 17/18; C09K 3/16
(52) U.S. Cl. ......................... 516/59; 524/588; 524/186; 516/67; 510/527; 424/70.12
(58) Field of Search .............................. 516/67, 69, 59; 524/186, 210, 588, 837; 510/527; 424/70.12

(56) References Cited

U.S. PATENT DOCUMENTS

| 4,486,567 A | * | 12/1984 | Bowman et al. | ............ 524/588 |
|---|---|---|---|---|
| 5,152,924 A | * | 10/1992 | Gee | ............................ 524/588 |
| 5,788,884 A | * | 8/1998 | Kuwata et al. | ............ 424/70.12 |
| 6,251,850 B1 | * | 6/2001 | Clarke et al. | ................ 510/527 |
| 6,303,565 B1 | * | 10/2001 | Clarke et al. | ................ 510/527 |

FOREIGN PATENT DOCUMENTS

| CA | 953058 | * | 8/1974 | |
|---|---|---|---|---|
| EP | 0432951 A2 | | 6/1991 | .......... A61K/7/075 |
| EP | 0798332 A2 | | 10/1997 | .............. C08J/3/03 |

* cited by examiner

Primary Examiner—Daniel S. Metzmaier
(74) Attorney, Agent, or Firm—Jim L. De Cesare

(57) ABSTRACT

An oil-in-water emulsion composition comprising 0.5% to 20% by weight of a cationic emulsifier, up to 75% by weight of siloxane and water, wherein the siloxane is liquid and has units according to the formula $R_a Si O_{4-a/2}$ wherein R is hydrocarbon or OH and a is 0 to 3 and wherein the cationic emulsifier is free from halogen in its counter ion, preferably methosulphate, etho-sulphate, acetate, tosylate, phosphate or nitrate. The siloxane preferably has a viscosity at 25° C. of from 10,000 to 1,000,000 mPa.s and is selected from polydimethyl siloxanes and polydimethyl polymethyl phenyl siloxanes. Also covered is a process of depositing siloxanes from such siloxanes.

4 Claims, No Drawings

SILOXANE EMULSIONS

The present invention relates to siloxane emulsions, in particular siloxane-in-water emulsions which are capable of allowing efficient deposition of siloxanes on substrates.

Siloxane emulsions are known in the art and have been used in a large number of applications. It is particularly relevant to the present invention that siloxane emulsions are used in applications where it is intended to deposit the siloxane onto substrates from aqueous compositions. Examples include textile treating processes, hair conditioner compositions and the like. However the efficiency of deposition is not usually very high especially in diluted conditions. There is a need to provide siloxane emulsions which allow an improved deposition rate of siloxanes onto substrates, especially negatively charged substrates. The present invention is particularly concerned with the deposition of polydiorganosiloxanes. Especially of interest are polydiorganosiloxanes which do not have special functional groups such as amine, carboxy or epoxy, particularly polydihydrocarbyl siloxanes are of interest.

In prior art compositions, siloxanes incorporated in an emulsion, maybe in a micro-emulsion form, that is to say the silicone is present as liquid droplets having a droplet size less than the wavelength of visible light and so the emulsion is substantially transparent or in macro-emulsions form where the siloxane droplets tend to be larger. The siloxanes before emulsification are usually those having relatively low viscosities because those with higher viscosities are more difficult to handle during the process of manufacturing the emulsion product.

Higher viscosity siloxanes are usually preferred for deposition, as they have a more dramatic effect when deposited onto substrates. For example they give improved conditioning effect on hair, greater substantivity etc.

In CA 0953058, an emulsion of reactive siloxane and an emulsion of a silicone polymer are used to impart onto fibre products a softening effect. In EP 432951 a shampoo composition comprises an emulsion of a non-volatile silicone in addition to a cationic derivative of guar gum. Although no specific details are given of the efficiency of silicone deposition, it can be calculated that in the applications described only partial deposition of the silicone is achieved, resulting in a waste of raw materials. In EP 798332 there is described an oil-in-water aqueous organopolysiloxane emulsion composition as a uniform dispersion which comprises 100 parts by weight of certain organopolysiloxane, from 0.5 to 30 parts by weight of a cationic surfactant which is a certain quaternary ammonium compound, from 10 to 300 parts by weight of water, wherein the organopolysiloxane is dispersed in the water in the form of particles having an average diameter of from 3 to 100 micrometer. This is developed especially to be suitable as additive in cationic hair-care compositions.

There is a need to find an emulsion system for siloxanes which will enable improved levels of deposition of the siloxane onto substrates.

It has been found surprisingly that the use of certain emulsifiers allows improved deposition of siloxanes.

According to one aspect of the invention there is provided an oil-in-water emulsion composition comprising:
(a) 0.5% to 20% by weight of a cationic emulsifier as the main emulsifier in the emulsion
(b) up to 75% by weight of a siloxane in dispersed phase with average particle size of no more than 2.5 micron and
(c) water wherein the siloxane is liquid at 25° C. and has units according to formula (1),

$$R_aSiO_{4-a/2} \quad (1)$$

wherein R is selected from hydrocarbon and hydroxyl groups and a has a value of from 0 to 3, with an average value of from 1.85 to 2.20, and wherein the cationic emulsifier does not have a halogen containing counter ion.

In the emulsion, the siloxane droplets are preferably incorporated to be in the form of a macro-emulsion. The average siloxane droplets are preferably from 0.2 μm to 2.5 μm, more preferably 0.3 to 2 μm.

The siloxane has units according to formula (1) above, and is preferably a polydihydrocarbyl siloxane consisting essentially of such units (1), most preferably consisting only of said units (1). Mixtures of several siloxane polymers may be used. It is however preferred that siloxanes as described above are the only organosilicon compounds present in the emulsion.

Particularly preferred siloxanes are linear or cyclic siloxanes of the general formulae (2) or (3)

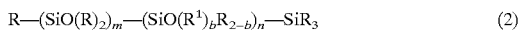

$$R-(SiO(R)_2)_m-(SiO(R^1)_bR_{2-b})_n-SiR_3 \quad (2)$$

(3)

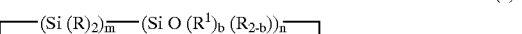

$$\boxed{-(Si(R)_2)_{\overline{m}}-(Si\ O\ (R^1)_b\ (R_{2-b}))_{\overline{n}}-}$$

wherein R is as defined above, preferably alkyl, aryl or alkenyl, more preferably having 1 to 20 carbon atoms, most preferably 1 to 6 carbon atoms, and particularly methyl, phenyl or vinyl, $R^1$ is a siloxane side chain of the general formula (4)

$$-O-(SiO(R)_2)_mSiR_3 \quad (4)$$

m is an integer with a value of from 0 to 100,000, preferably 100 to 5,000, n is an integer with a value of from 0 to 100, preferably 0, b has a value of 1 or 2, preferably 0.

It is preferred that siloxanes have the general formula (2) and have end groups which are selected from —Si(R")$_2$OH or —SiR"$_3$ wherein R" is as R above, with the exception of hydroxyl.

Preferred siloxanes have a dynamic viscosity of from 1 to 1,000,000 mPa·s at 25° C., more preferably 10,000 to 1,000,000 mPa·s, even more preferably 30,000 to 750,000 mPa·s, most preferably 40,000 to 300,000 mPa·s. Especially preferred siloxanes are polydimethyl siloxanes or polydimethyl polymethyl phenyl siloxanes e.g. cyclic polydimethyl siloxanes such as octamethyl cyclotetrasiloxane and decamethyl cyclopentasiloxane; linear siloxanes such as α,ω silanol end-blocked polydimethyl siloxane, α,ω trimethyl silyl end-blocked polydimethyl siloxane, dimethyl siloxane methyl phenyl siloxane copolymers, dimethyl siloxane methyl alkyl (C$_{12-18}$) siloxane copolymers, branched siloxane polymers and vinyldimethyl silyl end-blocked polydimethyl siloxanes.

Emulsification is effected using a cationic surfactant not having a halogen in the counter ion as the main surfactant, preferably as the only surfactant. Preferred cationic surfactants have counter ions selected from methosulphate, ethosulphate, acetate, tosylate, phosphate or nitrate. Examples of suitable cationic surfactants include fatty acid methylammonium methosulphate; fatty acid methylammonium ethosulphate; fatty acid methylammonium acetate; derivatives thereof e.g. ethoxylated fatty acid methylammonium methosulphates.

It is preferred to use a secondary emulsifier in conjunction with the cationic emulsifier and further additional emulsifiers may also be used. These secondary or additional emulsifiers may be-nonionic, but preferably are also cationic emulsifiers, most preferably of the type described above. The total amount of emulsifier used in an emulsion according to the invention is from 0.5 to 20% by weight based on the weight of the emulsion, preferably 2 to 12%, more preferably 3 to 10%.

The amount of siloxane incorporated in an emulsion according to the invention is up to 75%, but preferably is from 30 to 65%, more preferably 50 to 60% by weight based on the total weight of the emulsion. Preferably the weight ratio of siloxane over the total amount of emulsifiers used is from 3:1 to 120:1, preferably 3:1 to 30:1.

It is to be understood however that in applications the emulsions are preferably diluted for use in an environment which may contain a multitude of other ingredients. The dilution level will depend on the amount of deposition which is desired and the process of deposition. Suitable dilutions may be such that the siloxane in the application medium is present in concentrations from 0.001% to 50%, preferably for most applications 0.1 to 5%. An intermediate dilution step may be obtained by formulating an emulsion according to the invention into a product for sale to the end-user, e.g. a shampoo or polish formulation which is further diluted by the end-user in the actual application to the substrate, e.g. in a shower.

The emulsions may also contain one or more optional ingredients, selected from electrolytes, non-aqueous solvents, pH buffering agents, perfumes, perfume carriers, fluorescers, dyes, colorants, hydrotropes, antifoaming agents, antiredeposition agents, polymeric and other thickeners, viscosity modifiers, enzymes, optical brightening agents, opacifiers, anti-shrinking agents, anti-wrinkle agents, anti-spotting agents, germicides, fungicides, anti-oxidants, anti-corrosion agents, antistatic agents, sunscreens, colour care agents and anti-yellowing agents.

It was found that surprisingly the emulsion of the present invention allowed deposition of siloxanes onto substrates, especially negatively charged substrates, in much improved levels. It has been shown that deposition rates of siloxanes onto substrates can be close to 100% or even up to 100% in some cases. Suitable substrates include fibres, keratinous and others, e.g. wool, cotton, hair, synthetic fabrics, metal substrates, e.g. car bodies, wooden and synthetic hard surfaces, e.g. furniture etc. Substrates which are particularly suitable are negatively charged substrates.

In another aspect, the invention provides a process for depositing a liquid siloxane having units according to the formula $$R_aSiO_{4-a/2}$$

wherein R is selected from hydrocarbon and hydroxyl groups and a has a value of from 0 to 3, with an average of from 1.85 to 2.20 which comprises contacting a substrate with an oil-in-water emulsion according to the invention. In particular the process uses a diluted form of the emulsion, e.g. having from 0.001 to 50% siloxane. This dilution may be in an aqueous or non-aqueous medium.

It was also found that the emulsions were particularly useful for applications where corrosion of the apparatus used for the deposition was an issue, as no corrosive problems exist which are due to the use of these emulsions.

EXAMPLES

Example A

A linear trimethyl-terminated polydimethylsiloxane (PDMS) having a viscosity at 25° C. of 60,000 mPa·s was formulated as an aqueous emulsion by mixing.

| Component | % wt |
|---|---|
| PDMS | 60 |
| COCOTMAMS[1] | 3.5 |
| COCOPEMAMS[2] | 1.9 |
| Citric Acid | 0.3 |
| Water | to 100 |

[1] coconut trimethylammonium methosulphate
[2] coconut pentaethoxymethylammonium methosulphate

Examples 1 and 2

The emulsion of Example A was included in dilute (Example 1) and concentrate (Example 2) compositions, in which the amount of siloxane (PDMS) is expressed in absolute terms (% active)

| Component | Example 1 (Dilute) | Example 2 (Concentrate) |
|---|---|---|
| Cationic Softener[3] | 4.7 | 12.7 |
| Coconut 20EO Non-ionic | 0.1 | 0.7 |
| Tallow Alcohol | — | 0.7 |
| Silicone Anti-foam | 0.03 | 0.015 |
| Cetyl hydroxyethyl cellulose | 0.03 | — |
| Proxel[4] | 0.16 | 0.15 |
| Pearlescer (mica) | 0.1 | 0.18 |
| Dye | 0.0015 | 0.0048 |
| Perfume | 0.32 | 0.95 |
| Silicone PDMS (Emulsifiers) | 1.00–1.67 | 3.0–5.0 |
| COCOTMAMS | 0.058 | 0.17 |
| COCOPEMAMS | 0.032 | 0.1 |
| Water and other preservatives to 100 | | |

[3] Mixture Of 1,2 bis (Hardened tallowoxy) -3-trimethyl ammonium propane chloride and free fatty acid in a weight ratio of 6:1.
[4] Preservatives.

Example 3

Performance Evaluation

A composition comprising by weight 12.7% of the cationic softener of Examples 1 and 2, 0.7% coconut 20EO non-ionic, 0.7% tallow alcohol and 3% polydimethylsiloxane (% active) obtained from different emulsions containing 50% by weight of the active ingredient, was evaluated as follows.

Main washes were then to be carried out on white cotton. The conditions were as follows:

Machine: Candy Aquaviva 1000
Temperature: 40° C.
Programme: programme 5—Nonfast coloureds recommended for cotton
Water hardness: 13° F.H
Main wash product: 150 g Persil Bio powder via shuttle
Rinse product: A=Comfort (13.5% HEQ/FA) post dosed with 3% 1000 mPa·s PDMS 35 g dose (5.45% printer soln 63) B=Comfort (as above) Post dosed 3% 60,000 mPa·s PDMS 35 g dose Washload: 10 shirts or 10 T-shirts Drying: Hung on rails indoors.

The garments were assessed for degree of creasing and ease of ironing, using steam which characteristics give a measure of the deposition rate, which was found to be much improved over deposition from prior art emulsions.

Example 4

A first emulsion comprising 1% polydimethylsiloxane and non-ionic emulsifiers, was applied to a fabric in conditions similar to standard rinse cycle conditioning in a washing machine. A second emulsion where the non-ionic emulsifiers was replaced by a cationic emulsifier was tested in the same conditions. It was found that the deposition of siloxane onto the fabric increased from 47% for the first (comparative) emulsion to 86% for the second (illustrative) emulsion. On a different fabric it increased from 79% to 98%.

That which is claimed is:

1. An oil-in-water emulsion comprising:
   (i) 0.5–20 percent by weight of the total emulsion of a cationic emulsifier which is free from halogen as a counter ion, wherein the counter ion of the cationic emulsifier is selected from the group consisting of methosulphate, ethosulphate, tosylate, phosphate, and nitrate;
   (ii) 30–65 percent by weight of the total emulsion of a dispersed oil phase of a siloxane which is a liquid at 25° C. having the units $R_aSiO_{4-a/2}$ where R is a hydrocarbon group or an hydroxyl group, a is 0–3, and the average value of a is 1.85–2.20 for the siloxane; and
   (iii) water.

2. An oil-in-water emulsion according to claim 1 wherein the cationic emulsifier is a fatty acid methylammonium methosulphate, a fatty acid methylammonium ethosulphate, or a derivative thereof.

3. An oil-in-water emulsion according to claim 2 wherein the siloxane has a viscosity at 25° C. of 10,000–1,000,000 mPa.s.

4. An oil-in-water emulsion according to claim 3 wherein the siloxane is a polydimethylsiloxane or a polydimethyl polymethyl phenyl siloxane.

* * * * *